US009983609B2

(12) United States Patent
Perju et al.

(10) Patent No.: US 9,983,609 B2
(45) Date of Patent: May 29, 2018

(54) ELECTRICAL ENERGY DISTRIBUTION NETWORK IN A TRANSPORT VEHICLE, SUCH AS AN AIRCRAFT, AND AN ELECTRICAL INSTALLATION IN AN AIRCRAFT

(71) Applicants: AIRBUS OPERATIONS SAS, Toulouse (FR); AIRBUS SAS, Blagnac (FR)

(72) Inventors: Catalin Perju, Saint-Loup-Cammas (FR); Claude Cuiller, Castelnau d'estrefonds (FR); Kathryn Waidelich, Beauzelle (FR); Xavier Valancogne, Toulouse (FR); Hervé Le-Flecher, Colomiers (FR); Damien Valentin, Bristol (GB)

(73) Assignees: Airbus (SAS), Blagnac (FR); Airbus Operations (S.A.S.), Toulouse (FR)

( * ) Notice: Subject to any disclaimer, the term of this patent is extended or adjusted under 35 U.S.C. 154(b) by 805 days.

(21) Appl. No.: 14/537,404

(22) Filed: Nov. 10, 2014

(65) Prior Publication Data

US 2015/0134137 A1 May 14, 2015

(30) Foreign Application Priority Data

Nov. 8, 2013 (FR) ...................................... 13 60963

(51) Int. Cl.
*G05F 1/66* (2006.01)
*H04L 29/08* (2006.01)
*H02J 1/08* (2006.01)

(52) U.S. Cl.
CPC .................. *G05F 1/66* (2013.01); *H02J 1/08* (2013.01); *H04L 67/12* (2013.01)

(58) Field of Classification Search
CPC .............. G05F 1/66; H04L 67/12; H02J 1/08
See application file for complete search history.

(56) References Cited

U.S. PATENT DOCUMENTS

| 2001/0050176 A1* | 12/2001 | Gebhardt | ............... G01R 33/28 174/68.1 |
| 2003/0030326 A1 | 2/2003 | Shenai et al. | |

(Continued)

FOREIGN PATENT DOCUMENTS

| DE | 10 2005 005236 | 8/2006 |
| DE | 10 2011 115243 | 3/2013 |

OTHER PUBLICATIONS

Search Report for FR 13/60963 dated Jul. 29, 2014, 2 pages.

*Primary Examiner* — Umut Onat
(74) *Attorney, Agent, or Firm* — Nixon & Vanderhye P.C.

(57) ABSTRACT

An electrical energy distribution network in a transport vehicle, such as an aircraft, includes nodes to which at least one power supply source and at least one equipment can be connected by external links. The nodes are interconnected by internode links forming at least one mesh in a meshed network, each mesh being polygonal of order higher than or equal to three, at least one node of each mesh being an active node controlled by a management unit. The active nodes include switches and transmit physical operating characteristics measurements to the management unit, which configures the active nodes according to said measurements so as to enable each equipment to receive power supply via the meshed network. Flexibility in configuration of the electrical energy distribution network is thus achieved.

11 Claims, 9 Drawing Sheets

(56) References Cited

U.S. PATENT DOCUMENTS

| | | | |
|---|---|---|---|
| 2005/0074019 A1* | 4/2005 | Handforth | H04L 12/44 370/406 |
| 2010/0141264 A1* | 6/2010 | Ravot | G01R 31/11 324/533 |
| 2010/0206986 A1* | 8/2010 | Gallant | B64C 1/18 244/119 |
| 2011/0235627 A1* | 9/2011 | Wang | H04L 63/0428 370/338 |

* cited by examiner

Fig. 8 even within the management unit, in order to control each of the electrical connections of the internode and external links connected to said active node.

ELECTRICAL ENERGY DISTRIBUTION NETWORK IN A TRANSPORT VEHICLE, SUCH AS AN AIRCRAFT, AND AN ELECTRICAL INSTALLATION IN AN AIRCRAFT

This application claims priority to French Application No. 13/60963, filed Nov. 8, 2013, the entire contents of which is hereby incorporated by reference.

The present invention concerns an electrical energy distribution network for a transport vehicle, such as an aircraft, as well as an electrical installation of an aircraft.

In a transport vehicle such as an aircraft, various types (in terms of safety) of electrical equipment may coexist: equipment, referred to as critical, involved in the general functioning of the vehicle and on which the safety of the vehicle greatly depends (for example equipment directly involved in the conduct of takeoff, flight and landing of an aircraft), and non-critical equipment, the non-functioning of which has no impact on the safety of the vehicle (for example in-flight entertainment equipment, for an aircraft).

Currently, safety, in terms of protection of critical equipment against various recognised malfunctioning modes, is implemented by the physical separation of two independent electrical distribution networks: one referred to as normal that is used in the case of correct functioning of the whole of the electrical installation and the other one, referred to as emergency, used in the case of malfunctioning. The items of equipment are each connected by dedicated power supply lines and protected by protection elements (of the fuse or circuit breaker type).

In addition, in aircraft, the normal and emergency distribution networks are generally divided into several sub-networks in order to provide greater redundancy and separation of the electrical distribution.

Usually the electrical distribution networks have a tree topology in which the branches form buses. These buses are separated according to several criteria: voltage type, type of electrical circuit, power range, classification of the consumer. They are associated by channels for the normal network and for the emergency network. Interconnections are also provided between networks dedicated to alternating current and to direction current so as to allow reconfigurations of the electrical installation in the event of failure of the power supply sources.

These considerations give rise to great complexity of the cabling design, which is generally achieved by layers of wires installed along structures of the vehicle (for example fuselage, wings and tail unit in the case of an aircraft) and which in addition must adapt to the various demands of the customers.

The aim of the present invention is to propose an electrical energy distribution network for a transport vehicle that solves the problems of the prior art mentioned above and which, more particularly, affords easy configuration thereof, either at the time of its installation in order to meet a particular demand of a customer, or during operation in the case of malfunctioning, for example failure of a power supply source.

To this end, an electrical energy distribution network of a transport vehicle, such as an aircraft, according to the invention, which is of the type comprising nodes to which at least one power supply source and equipment to be supplied by said power supply source can be connected by means of links, referred to as external links, is characterised in that said nodes are connected together by internode links forming at least one mesh of a meshed network, said or each mesh being polygonal of an order higher than or equal to three, at least one node of the or each mesh being an active node designed to be controlled by a management unit in order to control each of the electrical connections of the internode and external links connected to said active node.

Because in a polygonal mesh of order higher than or equal to three, to go from one node to another, two paths are possible, an electrical energy distribution network according to the invention can be configured by controlling at least one active node by means of a management unit. This configuration can be done at the time of installation of the network in order to meet a requirement of the customer but may also be effected during malfunctioning.

The features of the invention mentioned below as well as others will emerge more clearly from a reading of the following description of example embodiments, said description being given in relation to the accompanying drawings, among which.

Figure 1:
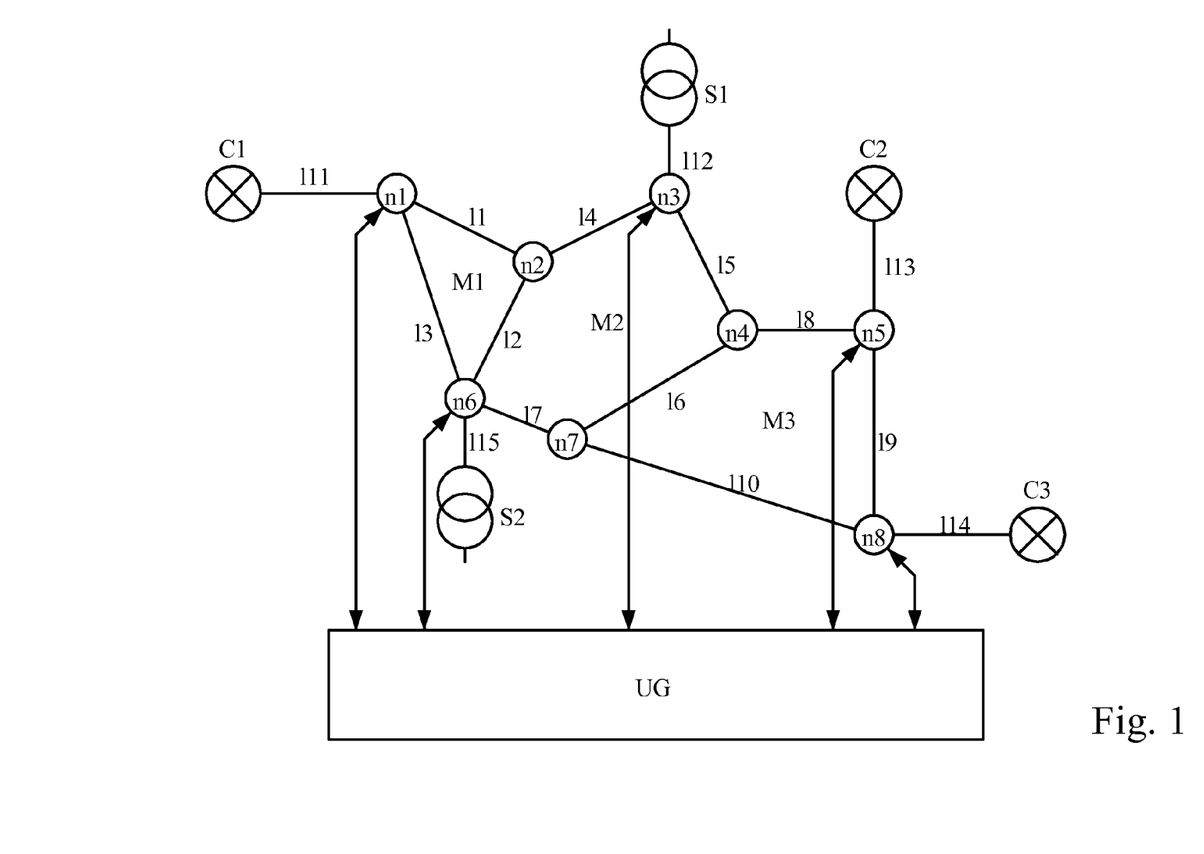
FIG. 1 is a diagram of an example embodiment of an electrical energy distribution network according to the present invention.

The electrical energy distribution network depicted in FIG. 1 is an example embodiment of a meshed network according to the invention that comprises three meshes (or cells) M1, M2 and M3, polygonal of order greater than or equal to three. More particularly, the mesh M1 consists of three nodes n1, n2 and n6 connected together by links l1, l2 and l3 which, because they provide the connection of two nodes, are referred to as internode links. The mesh M1 is therefore a triangular mesh (third-order polygon). The mesh M2 consists of nodes n2, n3, n4, n6 and n7 connected together by internode links l2, l4, l5, l6 and l7. This is a pentagonal mesh (fifth order polygon). As for the mesh M3, it consists of nodes n4, n5, n7 and n8 connected together by internode links l6, l8, l9 and l10 forming a quadrilateral (fourth order polygon.

In the example depicted, items of electrical equipment C1, C2 and C3 are, for supply thereof with electrical energy, connected to certain nodes in the distribution network (in this case the nodes n1, n5 and n8). Electrical energy sources (or power supply sources) S1 and S2 are connected to other nodes in the network (in this case the nodes n3 and n6) for supplying electrical energy, via the distribution network, to the electric equipment C1, C2 and C3. The links that provide the connection between a node and an item of electrical equipment or a source are referred to as external links since they are external to the distribution network proper. It is a case, in FIG. 1, of the links l11 to l15.

For reasons of safety (reconfiguration of the network in the event of failure of a source), sharing and control of the power consumed by the nodes and links in a network, a network according to the invention is advantageously connected to several power supply sources.

These sources are advantageously of the DC and high voltage (220 volts, for example) type. Compared with lower voltages, the high voltage makes it possible to use cables with a smaller cross section for the links because, for a given transported power, the current is lower. The use of cables with a smaller cross section makes it possible to reduce their weight, which is an advantage in aviation. Using DC supply sources avoids the consumption of reactive power peculiar to AC supply sources.

The electrical equipment can be connected either to an active node or to a passive node in the network depending on the architectural choices of the systems.

In the example of a meshed network depicted in FIG. 1, the nodes n1, n3, n5, n6 and n8 are said to be active nodes since the electrical connection between the links that they provide are controlled by a management unit UG. For example, with regard to the node n1, the electrical connections between the internode links l1, l3 and the external link l11 to the electrical equipment C1 are controlled by the management unit UG. Likewise, with regard to the node n3, the electrical connections between the internode links l4, l5 and the external link l12 to the source S1 are controlled by the management unit UG.

In the present description, the terms "connection", "connected" etc. relate to a physical and therefore not necessarily electrical connection, whereas the terms "link", "linked", etc. relate to an electrical link.

In an advantageous embodiment, the active nodes can transmit information to the management unit UG, in particular about their operating conditions, in the form of signals on the measurement of physical quantities related to these conditions.

As for the other nodes n2, n4 and n7, they are said to be passive since they provide the electrical connection of all the links to which they are connected. For example, at the node n2, the links l1, l2 and l4 are electrically connected together. Likewise, at the node n4, the links l5, l6 and l8 are electrically connected together.

In the case where several meshed networks coexist in the same aircraft, a single management unit UG can be shared by these networks in order firstly to control the respective active nodes thereof and secondly to receive information on the operating conditions thereof.

Each active node has an identifier, also referred to as a "physical address", which is particular to it.

Just after the installation of the network (or modification to the installation of the network), the installer reads the physical address of each active node and compares the read address with a list of physical addresses corresponding to active nodes that were previously authorised on the network. If the read address is not in the list, the corresponding active node must be replaced or reconfigured. On the other hand, if the address is in the list of certified physical addresses, the position of the node in the aircraft is entered at the same time as the physical address in a database that the management unit UG has.

The installer recommences with the nodes adjacent to the considered node and can thus gradually establish a map of the active nodes in the concerned distribution network. Thus it is easy for a technician to locate an active node (following for example failure thereof) for which only the physical address is known, in order to repair or even replace it.

The physical address of an active node can be communicated by radio by means, for example, of a radio-frequency identification device (RFID) that each active node has.

Figure 2:
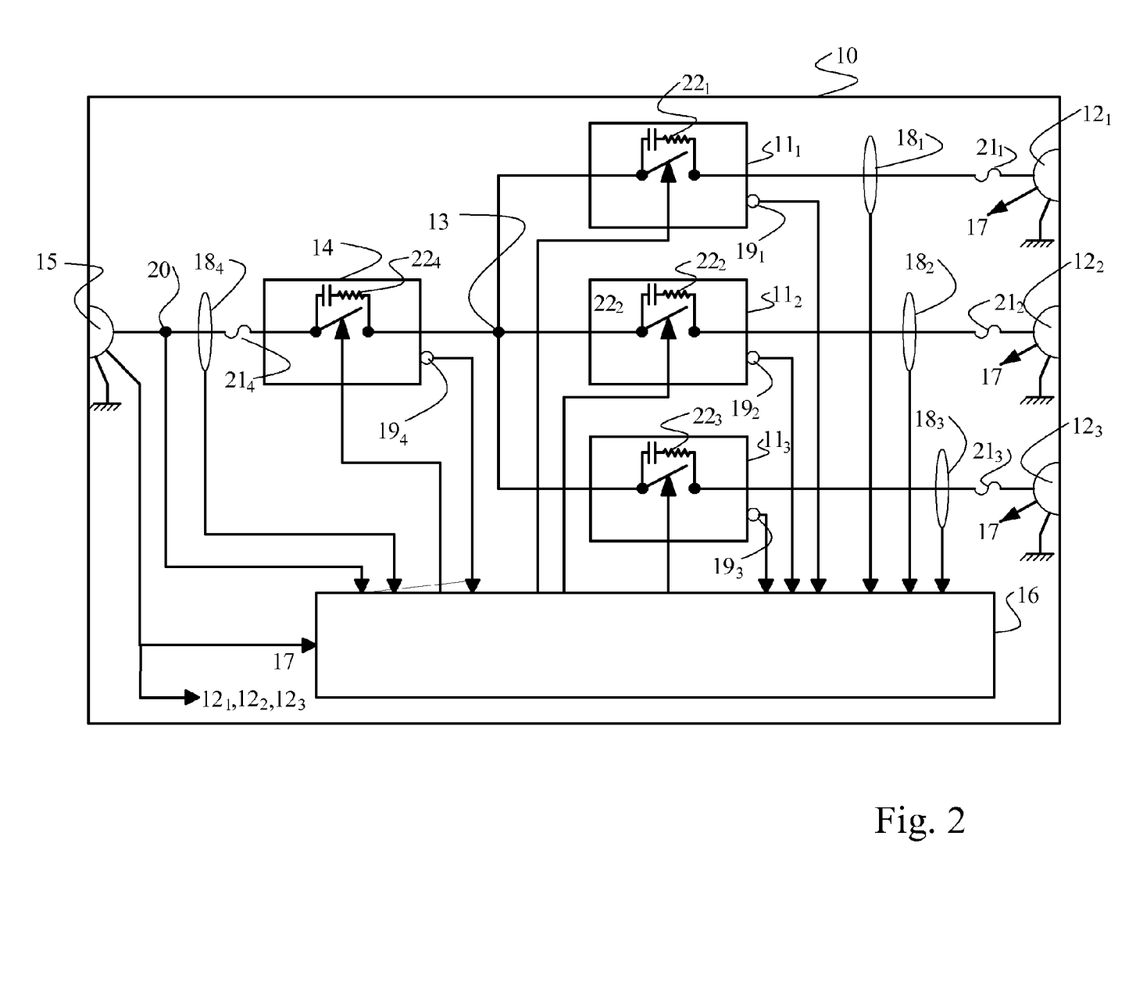
FIG. 2 is a block diagram of a node of an electrical energy distribution network according to the present invention.

FIG. 2 depicts an example embodiment of an active node 10 according to the invention. It comprises three ports $12_1$, $12_2$, $12_3$ each provided for the connection of an internode link and a port 15 for connection of an optional external link. More precisely, in the example embodiment depicted, each port $12_1$, $12_2$, $12_3$, 15 comprises a power supply pin for the power supply signal, an earth pin connected to the network earth and a control pin.

Each link, whether it is an internode or external link, is a cable, for example coaxial, which comprises a conductor for the power supply signal and a conductor for earth. The active or passive nodes provide, with the links, continuity of the earthing of the whole of the distribution network. Thus the support of the distribution network does not need to provide earth and therefore be metallic, as is the case with distribution networks of the prior art.

Each link may also comprise a conductor for the control signals. As can be seen in FIG. 2, each node, active or passive, is designed to provide, with the links, the transmission of these control signals in the whole of the network.

In a variant embodiment, the control signals are transported by an optical fibre that each link then has.

In another variant embodiment, the control signals are transported by carrier current at the same time as the power supply signal. The links then do not have any special conductors for transporting control signals.

The active node 10 also comprises three switches $11_1$, $11_2$ and $11_3$, each having a terminal that is connected to the power supply pin of a port $12_1$, $12_2$, $12_3$ and another terminal that is connected to a common point 13. It also comprises a switch 14, a terminal of which is connected to the power supply pin of a port 15 and the other terminal of which is connected to the common point 13.

The active node of FIG. 2 is designed to serve three internode links plus an external link. In general terms, if the number of internode links served by the node were N, the number of switches 11 would also be N, these N switches being respectively connected to N ports 12 and to a common point 13. Likewise, if the number of external links served by the node were M, the number of switches 14 would also be M, these M switches being respectively connected to M ports 15 and to the common point 13.

The switches $11_1$ to $11_3$ and 14 are switches controlled electrically (for example consisting of MOSFET or IGBT transistors, etc.) controlled by a control unit 16. This unit controls the switches through a circuit that isolates the power processing chain (for example electrogalvanically or optically). The latter receives or sends, on its input/output 17, via the control pins of the ports $12_1$, $12_2$, $12_3$ and 14, the control signals from or to the management unit UG (see FIG. 1).

The node 10 also comprises means for measuring physical operating characteristics of the node connected to the control unit 16. In particular, these measuring means may be means $18_1$ to $18_4$ for measuring the intensity of the electric current circulating in the internode links or in the external link, means $19_1$ to $19_4$ for measuring the temperature of the corresponding switches $11_1$ to $11_3$ and 14 and/or means 20 for measuring the voltage present on the external port 15, and/or means for measuring the direction of the current.

The values measured by the measuring means 18, 19 and 20 are directly processed by the control unit 16 which controls, according to the measuring signals, the opening of the switches $11_1$ to $11_3$ and 14, that is to say if these values are judged to be the result of a malfunction. The reaction of the control unit 16 can be very rapid, which prevents propagation of malfunctionings in the network.

Thus, when the power measured by one of the current-measuring means $18_i$ (i=1 to 4) exceeds a predetermined threshold and/or the directions of the currents are not those expected, the control unit 16 controls the corresponding switch $11_i$ or 14 so that it becomes opened, isolating the corresponding internode link or the external link.

Likewise, when the temperature measured by one of the sensors $19_1$ to $19_4$ is above a predetermined threshold value, the control unit 16 controls the corresponding switch $11_i$ or 14 so that it opens until the measured temperature once again becomes below said threshold value, or for a predetermined time after said threshold value has been exceeded.

Likewise, when the voltage measured by the means 20 on the power supply pin of the port 15 is below a predetermined value, the control unit 16 controls the switch 14 so that it opens until this voltage resumes a normal value.

The node 10 also comprises fuses $21_1$ to $21_4$, each mounted between a switch $11_1$ to $11_3$ and 14 and the power supply pin of the corresponding port $12_1$ to $12_3$ and 15 so as to cut the power supply of a link connected to a port of said node in an event of an excessively high intensity of the current in these links.

In order to avoid excessive heating of the switches $11_1$ to $11_3$ and 14, filters $22_1$ to $22_4$ consisting of a capacitor and a resistor in series are connected in parallel on their respective terminals.

Figure 3:
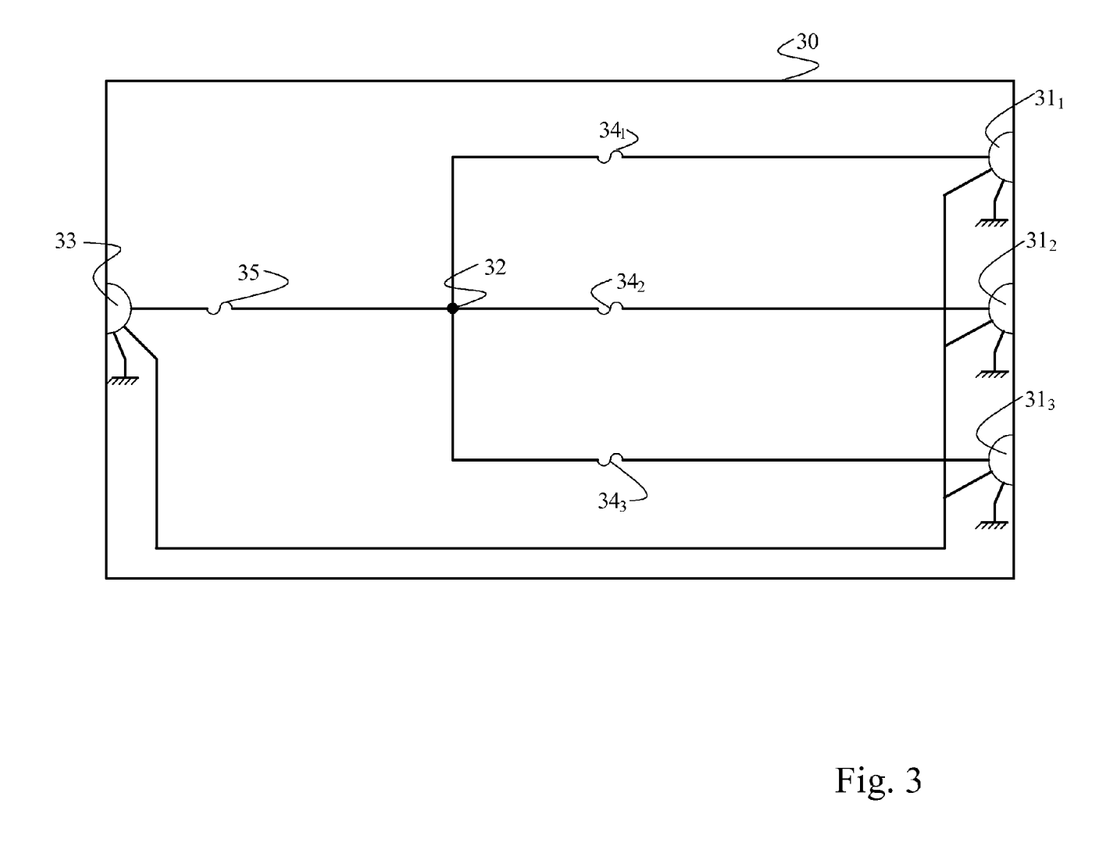
FIG. 3 is a block diagram of a passive node of an electrical energy distribution network, according to the invention.

FIG. 3 depicts an example embodiment of a passive node 30 according to the invention. It consists of three ports $31_1$, $31_2$, $31_3$ connected to a common point 32 and a port 33 also connected to said common point 32. Each link between the power supply pin of a port $31_1$, $31_2$, $31_3$ and 33 and the common point 32 is made by means of a fuse $34_1$, $34_2$, $34_3$ and 35. Thus the passive node 30 is designed to serve internode links plus an external link.

In general terms, if the number of internode links served by the node were N, the number of ports 31 of the node 30 would be N, and if the number of external links served by the node were M the number of ports 33 would be M.

To configure or reconfigure an active node in the network, the management unit UG transmits control data to the considered node and more exactly to its control unit 16, which, on reception thereof, performs the proper control of the switch or switches designated by said control data.

To do this, the management unit UG allocates a logic address to each active node in the network and to each switch. These addresses are for example in the form of version 4 Internet addresses and therefore consist of four bytes.

In a list of consecutive addresses, the first address is reserved for the node in its entirety and the others in the list for the switches of this node. For example, if the address of an active node is 196.95.70.10, the address of the first switch thereof is 196.95.70.11, the address of the second is 196.95.70.12, the address of the third is 196.95.70.13 and the address of the fourth is 196.95.70.14.

The transmission of a control data item to a given switch of an active node consists of transmitting the logic address of said switch. Taking the above example, closure of the second switch of an active node having the address 196.95.70.10 consists of transmitting a closure command data item to the address 196.95.70.12.

According to a particular embodiment, the transmission of a control data item to all the switches of an active node consists of transmitting to the logic address of the node. Taking the above example, closure of all the switches of the node with the address 196.95.70.10 consists of transmitting a closure control data item to this address 196.95.70.10.

With regard to the processing of the values measured by the measuring means 18, 19 and 20, a variant of the embodiment described above (where these values were directly processed by the control unit 16) is now described. These measured values are transmitted, by means of suitable messages, by the control unit 16 to the management unit UG. Further to the data relating to the measured values, this message comprises the address of the active node.

According to the reconfiguration of the whole of the distribution network that these values imply, the management unit UG transmits to the control unit 16 of an active node (or of a switch of an active node) identified by the address contained in the message that it previously received (and optionally to other active nodes to which this reconfiguration relates), control data for controlling at least one of the switches $11_1$ to $11_3$ and 14 in a suitable manner. Thus the management unit UG can manage the status of all the active nodes in a centralised manner, anticipate malfunctionings before these have taken place, for example by tendency analysis, by recognition of situation models (of the whole of the network) before malfunctioning, etc., and prevent the networking elements that are linked thereto being damaged, by opening or closing the concerned switches.

Figure 4A:
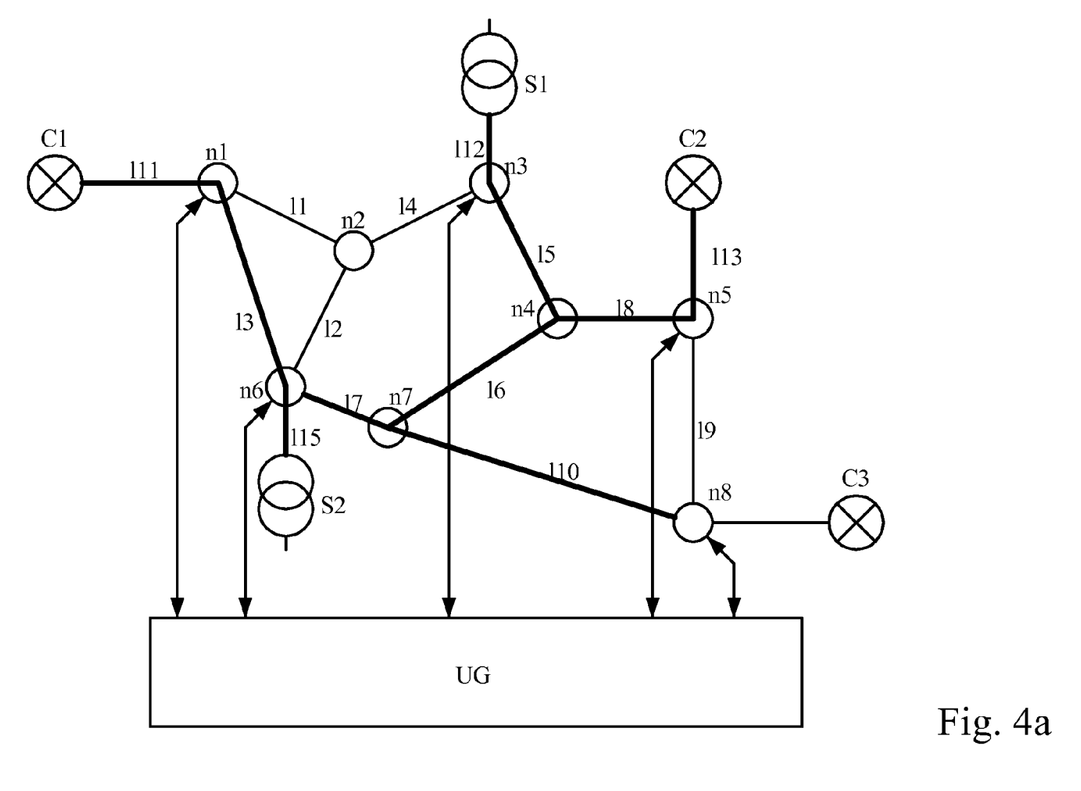
FIGS. 4a and 4b are respectively two views of the network of FIG. 1 in first and second configuration states.

In FIG. 4a, the meshed network of FIG. 1 is configured, by means of suitable commands from the management UG, so that the power supply source S2 supplies the electrical equipment C1 and the power supply source S1 supplies the electrical equipment C2. The electrical equipment C3 is not supplied. As can be seen in this FIG. 4a, the power supply source S2 supplies the electrical equipment C1 via the external link 115, the node n6, the internode link 13, the node n1 and the external link 111 between the node n1 and the electrical equipment C1. The power supply source S1 supplies the equipment C2 via the external link 112, the node n3, the internode link 15, the node n4, the internode link 18, the node n5 and the external link 113. The nodes n4 and n7 being passive nodes, the links 16, 17 and 110 are also supplied by the source S1.

Figure 4B:
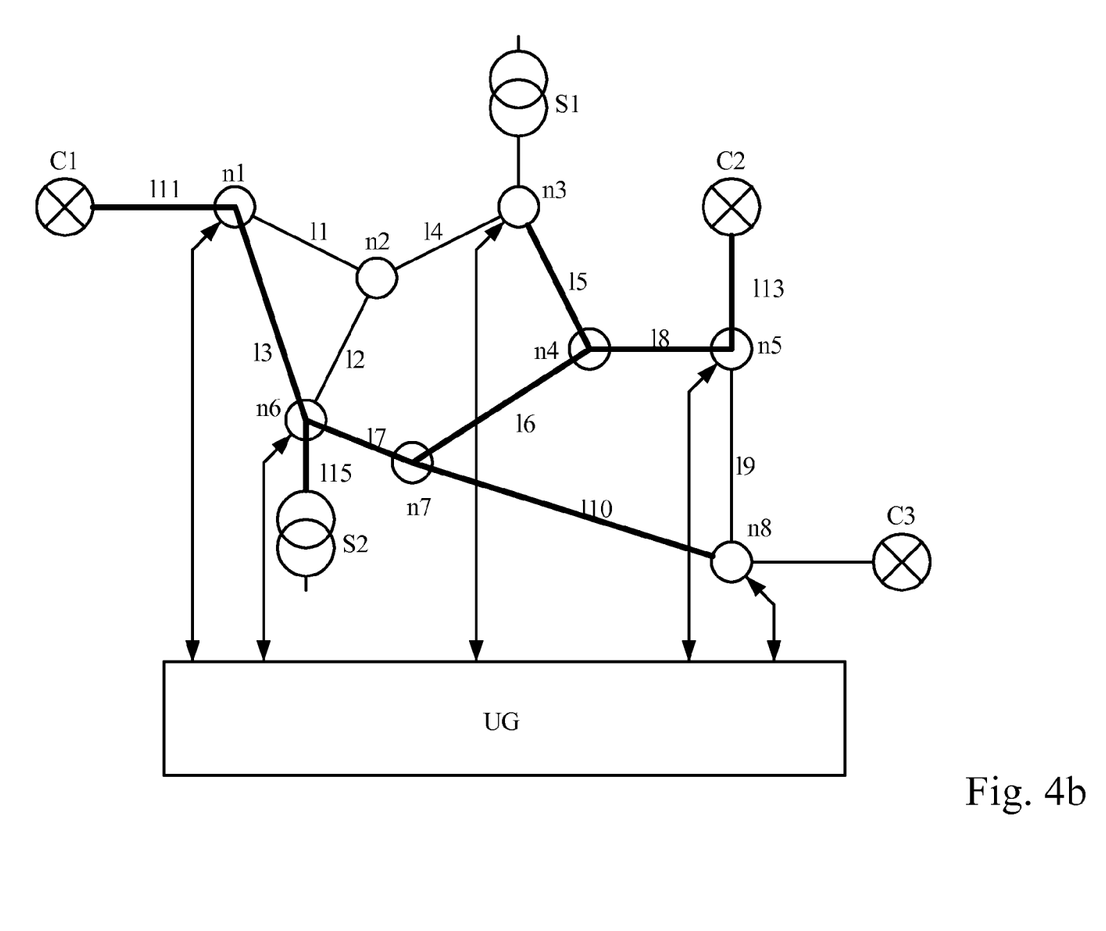

Following, for example, a malfunctioning of the power supply source S1 for which the voltage measured by the means 20 of the active node n3 on the terminal of the port 15 has become zero, the unit UG, which has received a message from this node n3 informing it of this malfunctioning, reconfigures the network so that the source S2 supplies the electrical equipment C2 in addition to the equipment C1. As can be seen in this FIG. 4b, the source S2 supplies the equipment C1 via the external link 115, the node n6, the internode link 13, the node n1 and the external link 111 between the node n1 and the equipment C1, as before. On the other hand, it supplies the equipment C2 via the external link 115, the node n6, the internode link 17, the passive node n7, the internode link 16, the passive node n4, the internode link 18, the node n5 and the external link 113. The nodes n4 and n7 being passive nodes, the links 15 and 110 are also supplied by the source S2.

The structure of a meshed network according to the invention may be such that all the meshes are identical in form.

Figure 5A:
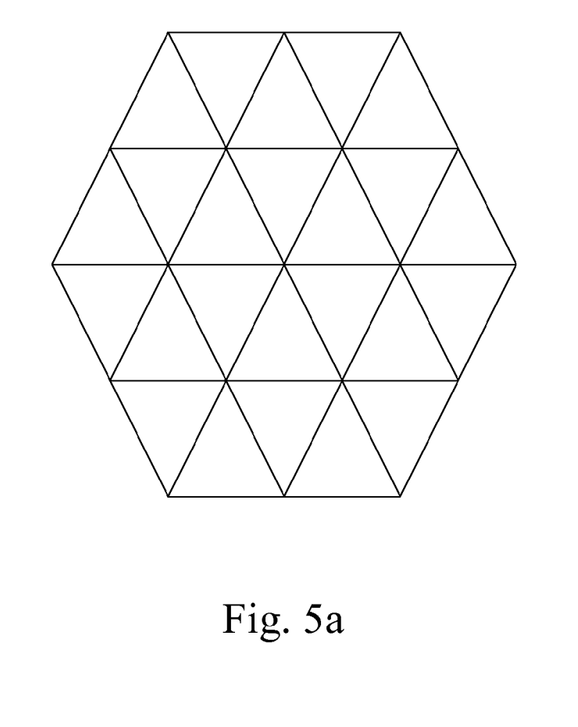
FIGS. 5a and 5b are two views of structures respectively triangular and square of an electrical distribution network according to the present invention.

For example, FIG. 5a depicts a meshed network where the elementary mesh is a triangle. The nodes in the network, with the exception of the nodes at the periphery, service six internode links plus at least one external link for optional connection to a power supply source or to electrical equipment. The number of connection topologies alternative to a given topology is large. Excellent safety results from this (continuous power supply of a given node) since, when a connection is lost, the probability of finding an alternative connection is greater than for other network structures. For a given number of nodes and a given coverage surface area of the network, the total length of cables necessary for the internode links is maximum compared with other network structures. However, the complexity of the nodes (the number of switches in particular) is greater than other structures.

Figure 5B:
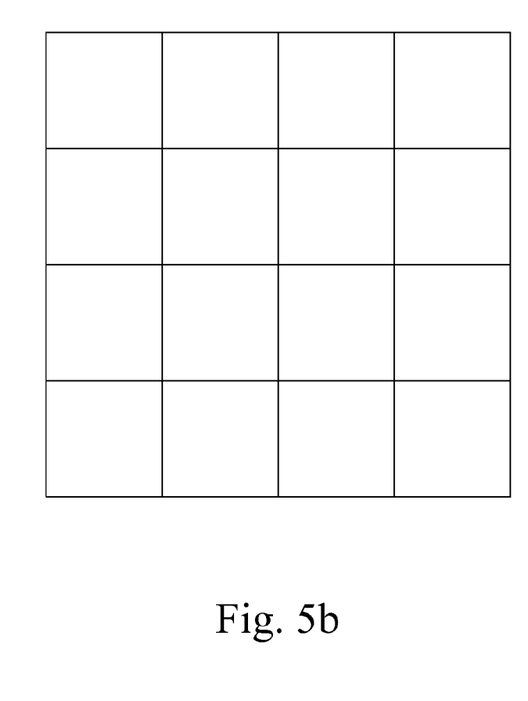

FIG. 5b depicts a meshed network where the elementary mesh is a square. In this case, the nodes in the network, with the exception of the nodes at the periphery, serve four internode links plus at least one link for a possible connection to a power supply source or to an item of electrical equipment. The number of connection topologies alternative to a given topology is less than that of the previous structure, but the safety given by such a network is still good. For a given number of nodes and a given coverage surface area of the network, the total length of the cables necessary for the internode links is less than the previous structure. The complexity of the nodes is less than the previous structure.

Figure 6:
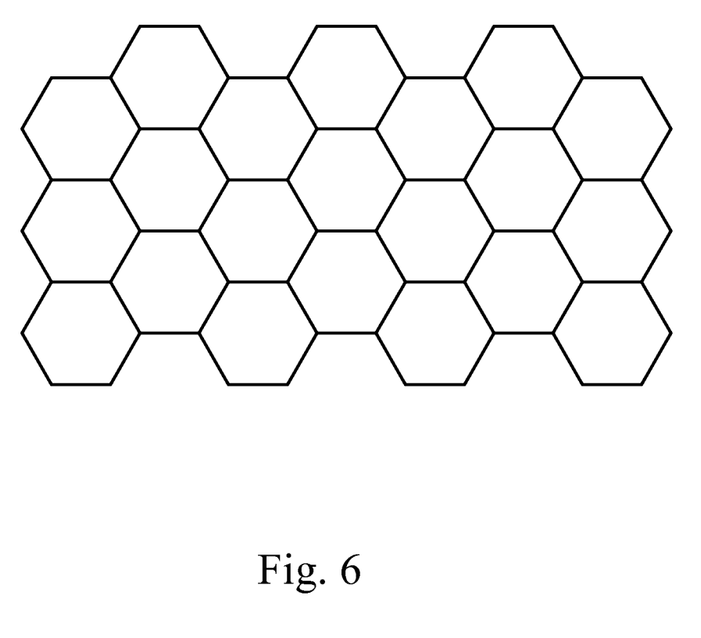
FIG. 6 is a view of a hexagonal structure of an electrical distribution network according to the present invention.

FIG. 6 depicts a meshed network where the elementary mesh is a hexagon. In this case, the nodes in the network, with the exception of the nodes at the periphery, serve three internode links plus at least one link for a possible connection to a power supply source or to an item of electrical equipment. The number of connection topologies alternative to a given topology is less than that of the previous structure, but the security given by such a network is still satisfactory and sufficient in many cases. For a given number of nodes and a given coverage surface area of the network, the total length of wires necessary for the internode links is less than the previous structure. Since a node provides the connection of four links, the complexity of the nodes is less than the previous structure. It is a network structure that therefore offers sure advantages over the previous structures, in particular in terms of simplicity and length of cables to be installed. In addition, it allows the connection of one link with one or other of the other two possible links.

Figure 7:
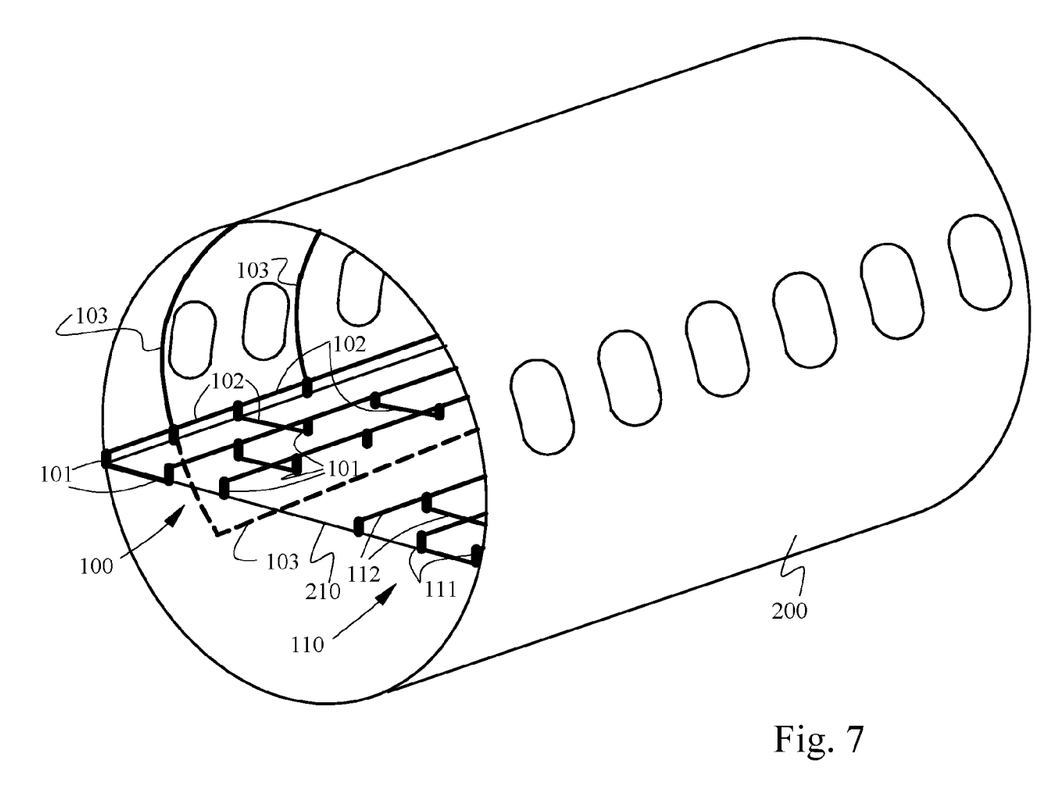
FIG. 7 is a view of an electrical installation of an aircraft that uses two electrical distribution networks according to the present invention.

FIG. 7 depicts an example implementation of two meshed networks, 100 and 110 in a fuselage 200 of an aircraft. As can be seen, each network 100, 110 is installed level with the floor 210 of the aircraft. The nodes 101, 111 of each of these networks can also be seen, interconnected by means of internode links 102, 112. External links 103 leave towards the top and towards the rear of the fuselage.

Figure 8:
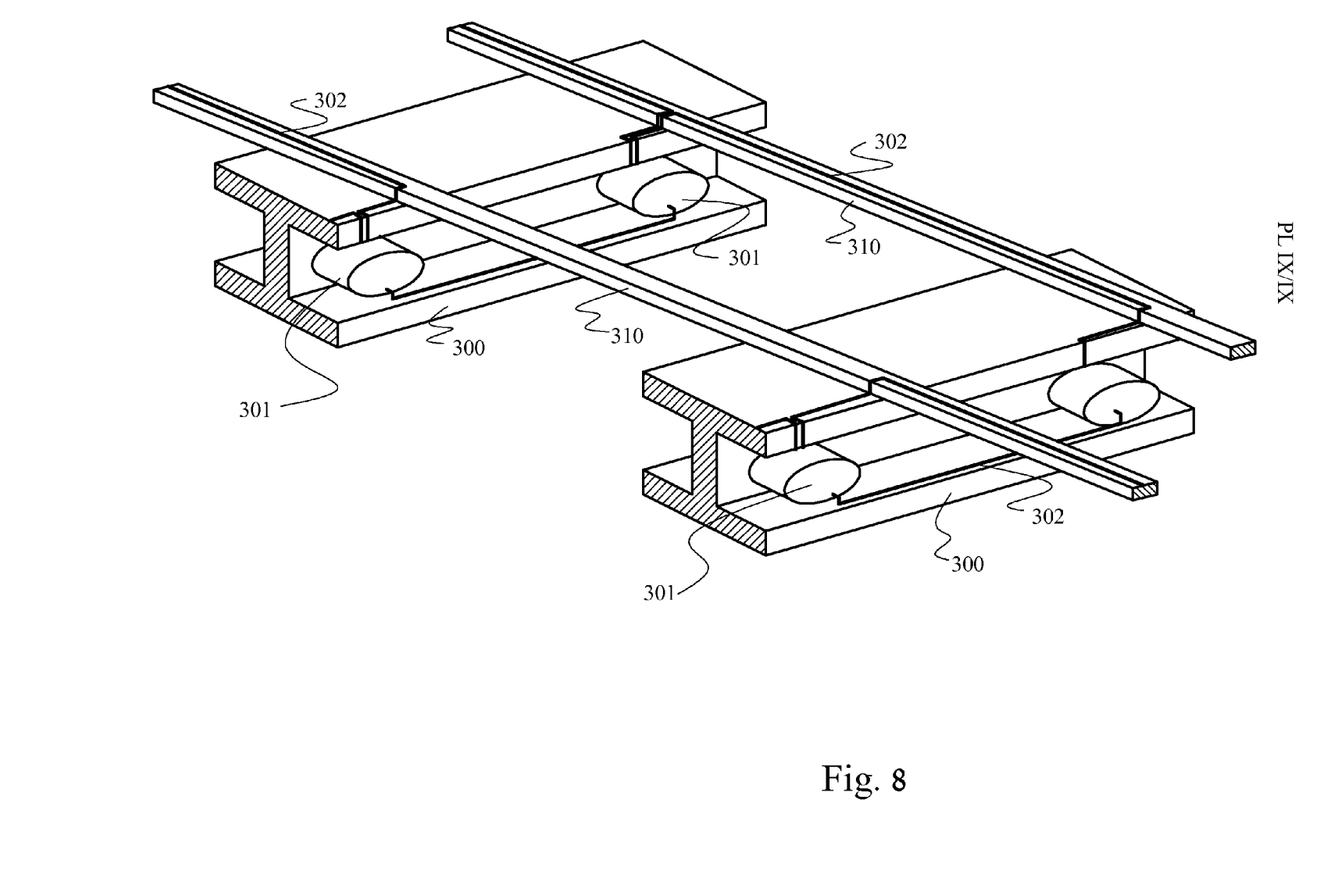
FIG. 8 is a view of a detail of an electrical installation of an aircraft according to FIG. 7.

FIG. 8 depicts an example installation of nodes and links of a meshed network according to the present invention. Cross members 300 have been shown, constituting the structure of the aircraft, and on which the floor 210 rests (see FIG. 7) as well as runners 310 provided for fixing the aircraft passenger seats. On these cross members 300 there are fixed, advantageously by adhesive bonding, nodes 301 connected together by links 302 (either internode links or external links depending on the topology of the network in place) themselves fixed for example also by adhesive bonding, or imprinted either on the cross members 300 or on the runners 310.

The invention claimed is:

1. An electrical energy distribution network for a transport vehicle, the electrical energy distribution network comprising a management unit and nodes to which at least one power supply source and at least one equipment to be supplied by said power supply source can be connected by external links, wherein said nodes are connected together by internode links forming at least one mesh of a meshed network, each mesh being polygonal of an order higher than or equal to three and providing two paths between any two nodes in a respective mesh, at least one node in each mesh being an active node, each active node in said electrical energy distribution network being controlled by the management unit so as to control each electrical connection of the internode links and external links connected to said active node, wherein each active node comprises:
switches, each switch having a terminal connected to a port to which an internode or external link is connected and a terminal connected to a common point, and
a control unit configured to receive control data from said management unit and to control each of said switches to open or close an electrical connection to an internode or external link, wherein each active node is configured to measure physical operating characteristics of said node that delivers measurement signals to the control unit, and wherein the control unit is configured to transmit said measurement signals to the management unit, which is configured to configure the nodes according to said measurement signals to enable each equipment to receive power supply via the meshed network.

2. The electrical energy distribution network according to claim 1, wherein all the meshes of said meshed network are identical.

3. The electrical energy distribution network according to claim 1, wherein each other node different than one of said active node provides electrical connection of all the internode links and external links connected to said other node.

4. The electrical energy distribution network according to claim 1, wherein said management unit is configured to allocate a logical address to each active node and to each switch of said active node, and said management unit is configured to transmit control data to the logical address of a respective switch or, in the case of control data relating to all the switches of any active node, the logical address of said active node.

5. The electrical energy distribution network according to claim 1, wherein the internode and/or external links consist of coaxial cables comprising a conductor for a power supply signal and a conductor for ground, all of the nodes enabling the continuity of network ground connectivity with the internode and external links.

6. The electrical energy distribution network according to claim 5, wherein said internode or external links are further configured to transmit control signals, all of the nodes enabling transmission of said control signals throughout the meshed network.

7. The electrical energy distribution network according to claim 1, wherein each active node has a physical address and is configured to communicate said physical address.

8. The electrical energy distribution network according to claim 1, wherein the electrical energy distribution network is installed in an aircraft.

9. The electrical energy distribution network according to claim 8, wherein the electrical energy distribution network is one of a plurality of electrical energy distribution networks installed on the aircraft, the active nodes of which are controlled by a single management unit.

10. The electrical energy distribution network according to claim 8, wherein said electrical energy distribution networks is installed at floor level in the aircraft.

11. The electrical energy distribution network according to claim 10, wherein the nodes of said electrical energy distribution network installed at floor level in the aircraft are fixed on cross members forming part of the aircraft's structure and the links are mounted either on said cross members or on passenger seat runners of the aircraft.

* * * * *